United States Patent
Suzuki

[11] Patent Number: 6,082,242
[45] Date of Patent: Jul. 4, 2000

[54] POWER STEERING SYSTEM

[75] Inventor: Katsuhiro Suzuki, Kani, Japan

[73] Assignee: Kayaba Industry Co., Ltd., Tokyo, Japan

[21] Appl. No.: 09/172,432

[22] Filed: Oct. 14, 1998

[30] Foreign Application Priority Data

Oct. 16, 1997 [JP] Japan ..................................... 9-299486

[51] Int. Cl.$^7$ ...................................................... F15B 9/10
[52] U.S. Cl. ................ 91/375 A; 91/375 R; 137/625.21; 137/625.23; 180/441
[58] Field of Search ..................................... 180/441, 417, 180/421, 422; 91/375 A, 375 R; 137/625.21, 625.23

[56] References Cited

U.S. PATENT DOCUMENTS

| | | | |
|---|---|---|---|
| 4,516,471 | 5/1985 | Duffy ..................................... | 91/375 A |
| 4,577,660 | 3/1986 | Haga et al. ......................... | 137/625.24 |
| 4,771,841 | 9/1988 | Uchida et al. ........................... | 180/142 |
| 4,924,910 | 5/1990 | Tabata et al. ........................ | 137/625.23 |
| 5,048,630 | 9/1991 | Schaffer .................................. | 180/142 |
| 5,133,384 | 7/1992 | Tabata et al. ......................... | 137/625.23 |
| 5,244,012 | 9/1993 | Tabata et al. ......................... | 137/625.23 |
| 5,372,214 | 12/1994 | Haga et al. ............................... | 180/132 |
| 5,471,838 | 12/1995 | Suzuki et al. ............................ | 60/468 |

FOREIGN PATENT DOCUMENTS

| | | | |
|---|---|---|---|
| 8-192758 | 7/1996 | Japan ................................ | B62D 5/06 |
| 8-268304 | 10/1996 | Japan ................................ | B62D 5/07 |
| 8-301132 | 11/1996 | Japan ................................ | B62D 5/07 |

*Primary Examiner*—Christopher P. Ellis
*Assistant Examiner*—Rashmi Sharma
*Attorney, Agent, or Firm*—Steinberg, Raskin & Liberchuk, P.C.

[57] ABSTRACT

A power steering system which minimizes control flow supplied to a valve mechanism when a steering assist force is not required and thereby reduces energy loss and which also prevents a deterioration in steering feeling occurring when the control flow changes. A valve mechanism V is made up of a power cylinder control valve for controlling a control flow and distributively supplying it to a power cylinder Q and a bypass control valve for bypassing the two pressure chambers of the power cylinder C; the bypass control valve is normally closed, but while the control flow Q is being increased from a minimum flow $Q_1$ to a flow $Q_2$ required for an assist force the bypass control valve opens and bypasses the two pressure chambers of the power cylinder C so that the pressure difference between the pressure chambers rises more gently than the control flow and the driver does not experience a feeling of the steering wheel suddenly being taken over.

6 Claims, 12 Drawing Sheets

POWER STEERING SYSTEM

BACKGROUND OF THE INVENTION

This invention relates to a power steering system capable of minimizing a control flow supplied to a valve mechanism during non-steering and thereby reducing energy loss.

There have been power steering systems which to reduce energy loss are constructed to decrease a control flow supplied to a valve mechanism when an assist force is not required.

Power steering systems of this kind are disclosed for example in Japanese Patent Publication No.H8-192758, Japanese Patent Publication No.H8-268304 and Japanese Patent Publication No.H8-301132, and an example of one is shown in FIG. 15.

As shown in FIG. 15, a pump is connected to a valve mechanism V by way of a flow control mechanism 1.

In the flow control mechanism 1, a variable throttle 2 is connected to the pump. This variable throttle 2 in its normal state maintains a minimum aperture, but when the pressure on its upstream side increases it switches against the resistance of a spring 3 and increases its aperture.

Also, upstream of the variable throttle 2, a flow control valve 4 is connected to the pump. This flow control valve 4 switches in correspondence with the pressure difference across the variable throttle 2 and keeps that pressure difference constant. Therefore, if the aperture of the variable throttle 2 is constant, the flow passing through the variable throttle 2 is kept constant.

A relief valve 5 determines the maximum pressure of the circuit.

A control flow controlled by the flow control mechanism 1 is supplied to a valve mechanism V. This valve mechanism V controls the control flow and distributively supplies it to a power cylinder C.

In this valve mechanism V, for example when a steering wheel W is turned in one direction, the apertures of control throttles 6a, 6c increase, and at the same time the apertures of control throttles 6b, 6d decrease. And reversely, when the steering wheel W is turned in the opposite direction, the apertures of the control throttles 6b, 6d increase and simultaneously the apertures of the control throttles 6a, 6c decrease.

In this power steering system, during non-steering, because the load pressure P of the power cylinder C is low, the pressure upstream of the variable throttle 2 is also low, and the variable throttle 2 maintains its minimum aperture. Consequently, only a minimum flow $Q_1$ determined by this minimum aperture is supplied to the valve mechanism V side (the region a in FIG. 16).

During steering, on the other hand, the load pressure P of the power cylinder C increases, and when it reaches a predetermined pressure $P_1$ the variable throttle 2 switches and its aperture increases. Consequently, a flow Q controlled in correspondence with the aperture of the variable throttle 2 is supplied to the valve mechanism V side (the region b in FIG. 16).

And when the load pressure P of the power cylinder C exceeds a set pressure $P_2$, the aperture of the variable throttle 2 is held at a maximum aperture, and a flow $Q_2$ required for an assist force is supplied to the valve mechanism V side (the region c in FIG. 16).

However, in the related art power steering system described above, in the region (the region b of FIG. 16) over which the control flow Q changes from the minimum flow $Q_1$ to the flow $Q_2$ required for an assist force, the pressure in the valve mechanism V also changes as a result of this change in flow.

Consequently, in that instant an assist force suddenly develops, and the driver may experience a disconcerting feeling such as one of the steering wheel being taken over, and the steering feeling thus deteriorates.

SUMMARY OF THE INVENTION

It is therefore an object of the present invention to provide a power steering system which when an assist force is not required can minimize the control flow supplied to the valve mechanism side and thereby reduce energy loss and with which furthermore there is no deterioration in steering feeling when the control flow changes.

The, invention presupposes a power steering system having a pump and a flow control mechanism for controlling working fluid discharged by the pump and a valve mechanism for controlling a control flow supplied from the flow control mechanism and operating a power cylinder, the flow control mechanism maintaining the control flow at a minimum flow when an assist force is not required and increasing the control flow and maintaining the control flow at a flow required for the assist force when an assist force is required.

In a first provision of the aspect, the valve mechanism is made up of a power cylinder control valve for controlling the control flow and distributively supplying it to the power cylinder and a bypass control valve for bypassing both pressure chambers of the power cylinder, and the bypass control valve is normally closed but opens and bypasses the two pressure chambers of the power cylinder while the control flow increases from the minimum flow to the flow required for the assist force.

In a second provision of the aspect, in a power steering system according to the first provision, the valve mechanism consists of a rotary valve made up of a sleeve and a rotary spool fitted rotatably with respect to each other and in the rotary spool are formed a pair of supply channels disposed diametrically opposing each other and four return channels respectively disposed on both sides of these supply channels and a pair of bypass channels disposed staggered by about 90° in phase from the supply channels and in the sleeve are formed a pair of input ports for supplying the control flow to the supply channels and a pair of first cylinder control grooves respectively disposed on one side of each of the input ports and connecting with a first pressure chamber of the power cylinder and a pair of second cylinder control grooves respectively disposed on the other side of each of the input ports and connecting with a second pressure chamber of the power cylinder and a pair of first bypass control grooves respectively disposed on the opposite sides of the return channels from the second cylinder control grooves and connecting with the first cylinder control grooves and a pair of second bypass control grooves respectively disposed on the opposite sides of the return channels from the first cylinder control grooves and connecting with the second cylinder control grooves and control throttles are provided as center-open valves between the supply channels and the first and second cylinder control grooves and between the first and second cylinder control grooves and the return channels and these control throttles constitute the power cylinder control valve and a control throttle is formed as a center-open valve between one of the bypass channels and the respective first bypass control groove and a control throttle is formed as a center-closed valve between the same bypass channel and the respective second bypass control groove and a control throttle is formed as a center-closed valve between the other of the bypass channels and the respective first bypass control groove and a control throttle is formed as a center-open valve between that bypass channel and the respective second bypass control groove and these control throttles constitute the bypass control valve.

In a third provision of the aspect, in a power steering system according to the first provision, the valve mechanism consists of a rotary valve made up of a sleeve and a rotary spool fitted rotatably with respect to each other and in the rotary spool are formed a pair of first supply channels disposed diametrically opposing each other and a pair of second supply channels disposed staggered by about 90° in phase from the first supply channels and four channels disposed between the first and second supply channels and of these four channels an opposing pair of channels constitute return channels and the remaining pair of channels constitute bypass channels and in the sleeve are formed a pair of first input ports for supplying the control flow to the first supply channels and a pair of second input ports for supplying the control flow to the second supply channels and a pair of first cylinder control grooves respectively disposed on the return channel sides of the first input ports and connecting with a first pressure chamber of the power cylinder and a pair of second cylinder control grooves respectively disposed on the return channel sides of the second input ports and connecting with a second pressure chamber of the power cylinder and a pair of first bypass control grooves respectively disposed on the opposite sides of the first input ports from the first cylinder control grooves and connecting with the first cylinder control grooves and a pair of second bypass control grooves respectively disposed on the opposite sides of the second input ports from the second cylinder control grooves and connecting with the second cylinder control grooves and between the first and second supply channels and the first and second cylinder control grooves and between the first and second cylinder control grooves and the return channels control throttles are formed as center-open valves and these control throttles constitute the power cylinder control valve and between one of the bypass channels and the respective first bypass control groove a control throttle is formed as a center-open valve and between the same bypass channel and the respective second bypass control groove a control throttle is formed as a center-closed valve and between the other bypass channel and the respective first bypass control groove a control throttle is formed as a center-closed valve and between that bypass channel and the respective second bypass control groove a control throttle is formed as a center-open valve and these control throttles constitute the bypass control valve.

In a fourth provision of the aspect, in a power steering system according to any of the first through third provisions, when the load pressure of the power cylinder is lower than a predetermined pressure the flow control mechanism maintains the control flow at the minimum flow and when the load pressure exceeds the predetermined pressure it increases the control flow and after the load pressure reaches a set pressure the flow control mechanism maintains the load pressure at a flow required for an assist force.

In a fifth provision of the aspect, in a power steering system according to any of the first through third provisions, the flow control mechanism, when the steering angle is in a neutral range, maintains the control flow at the minimum flow and when the steering angle exceeds the neutral range increases the control flow and after the steering angle reaches a set angle maintains the control flow at a flow required for an assist force.

And in a sixth provision of the aspect, in a power steering system according to any of the first through third provisions, the flow control mechanism, when the steering torque is small, maintains the control flow at the minimum flow and when the steering torque exceeds a predetermined torque increases the control flow and after the steering torque reaches a set torque maintains the control flow at a flow required for an assist force.

DETAILED DESCRIPTION OF THE PREFERRED EMBODIMENTS

A first preferred embodiment of a power steering system according to the present invention is shown in FIGS. 1 through 5. However, in this first preferred embodiment, the flow control mechanism 1 is the same as in the related art described above, and only the construction of the valve mechanism V has been changed, and accordingly the following description will center on this valve mechanism V.

Figure 1:
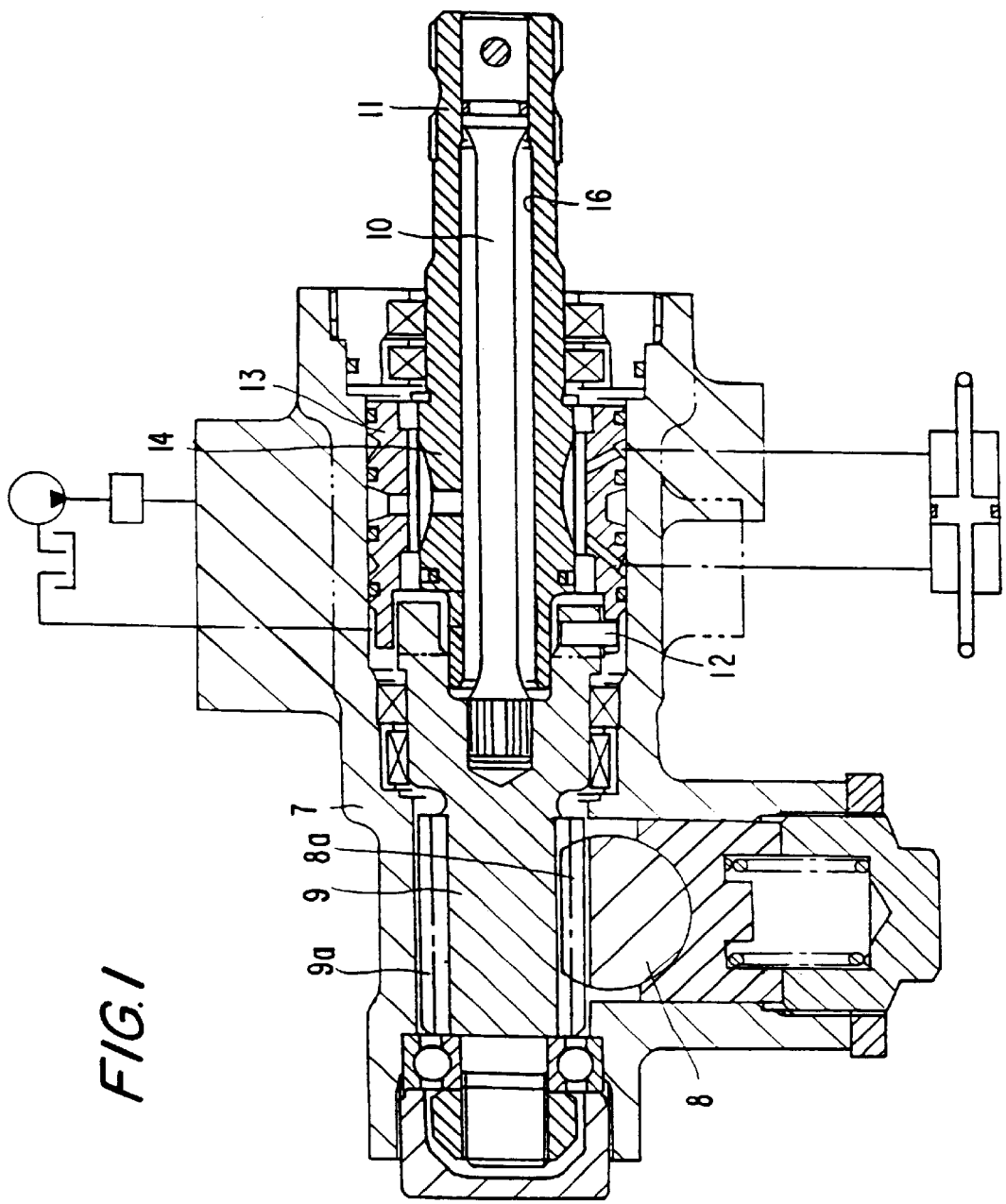
FIG. 1 is a sectional view of a power steering system of a first preferred embodiment of the invention.

As shown in FIG. 1, a rack shaft 8 having vehicle wheels (not shown) linked to its ends is assembled to a casing 7. A pinion 9a provided on a pinion shaft 9 meshes with a rack 8a of this rack shaft 8.

Also, an input shaft 11 is connected by way of a torsion bar 10 to a base end of the pinion shaft 9. This input shaft 11 is linked to a steering wheel W (not shown).

A sleeve 13 is connected by way of a pin 12 to the base end of the pinion shaft 9. Consequently, when the pinion shaft 9 rotates, this sleeve 13 also rotates integrally therewith.

A rotary spool 14 is formed integrally with the outer circumferential face of the input shaft 11.

The sleeve 13 and the rotary spool 14 fit rotatably with respect to each other and form a rotary valve constituting a valve mechanism V.

Figure 2:
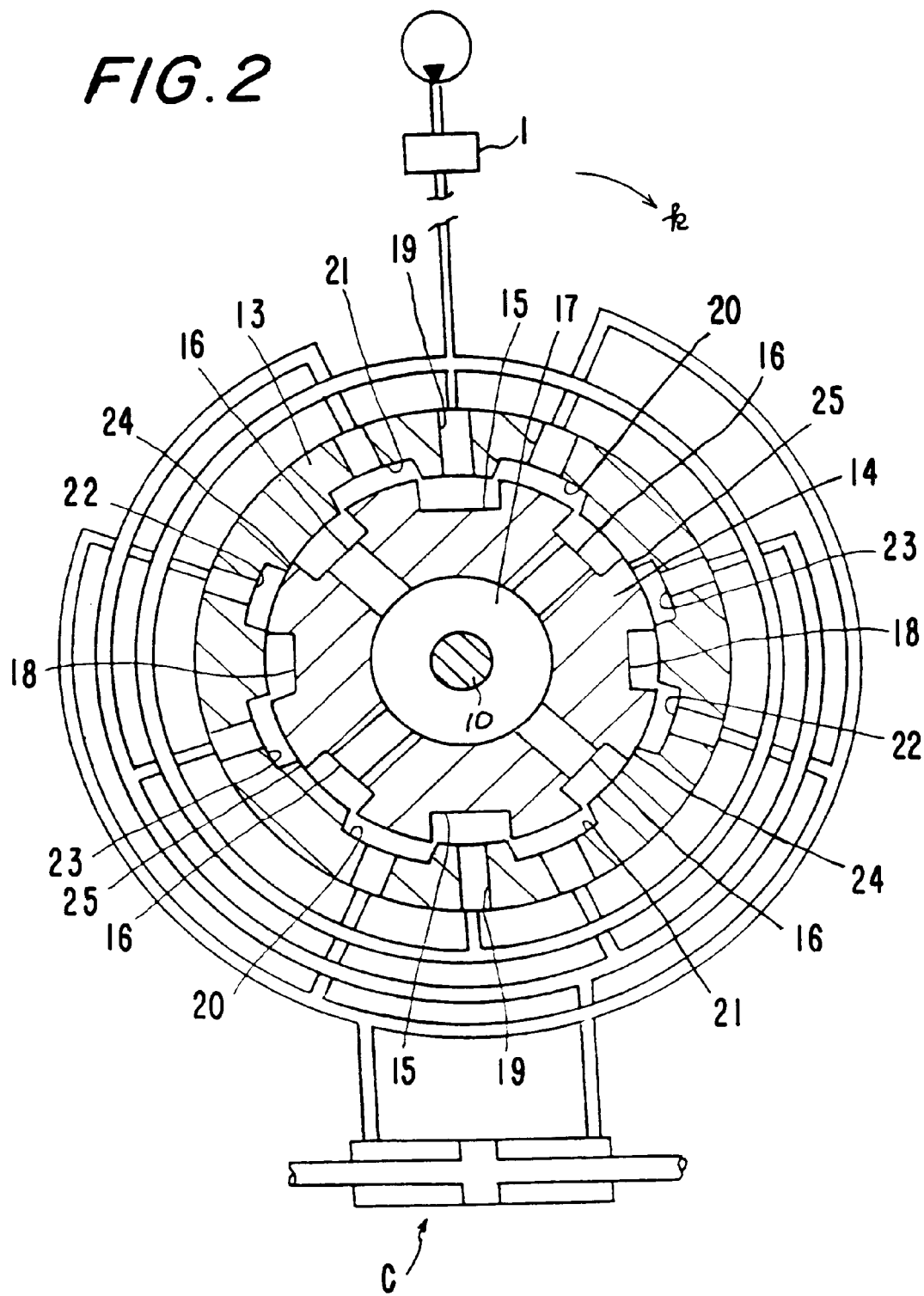
FIG. 2 is a sectional view of a rotary valve constituting a valve mechanism V in the same power steering system.

As shown in FIG. 2, a pair of supply channels 15 disposed diametrically opposite each other are formed in the rotary spool 14. Return channels 16 are formed on either side of each of these supply channels 15, and the return channels 16 are connected with a tank by way of a torsion bar hole 17.

Also, a pair of bypass channels 18 are formed in the rotary spool 14 in positions staggered by about 90° in phase from the supply channels 15.

A pair of input ports 19 through which control flow is supplied from the flow control mechanism 1 are formed in the sleeve 13, and these input ports 19 connect with the supply channels 15. First and second cylinder control grooves 20, 21 are formed in the sleeve 13 on opposite sides of each of the input ports 19; the first cylinder control grooves 20 are connected with a first pressure chamber of a power cylinder C, and the second cylinder control grooves 21 are connected with a second pressure chamber of the power cylinder C.

Also, first bypass control grooves 22 are formed in the sleeve 13 on the opposite sides of respective return channels 16 from the second cylinder control grooves 21. This pair of first bypass control grooves 22 are connected to the first cylinder control grooves 20. However, block parts 24 are formed so that these first bypass control grooves 22 do not connect with the return channels 16, even when the rotary valve operates.

Second bypass control grooves 23 are formed in the sleeve 13 on the opposite sides of respective return channels 16 from the first cylinder control grooves 20. This pair of second bypass control grooves 23 are connected with the second cylinder control groove s 21. However, block parts 25 are formed so that these second bypass control grooves 23 do not connect with the return channels 16, even when the rotary valve operates.

Figure 3:
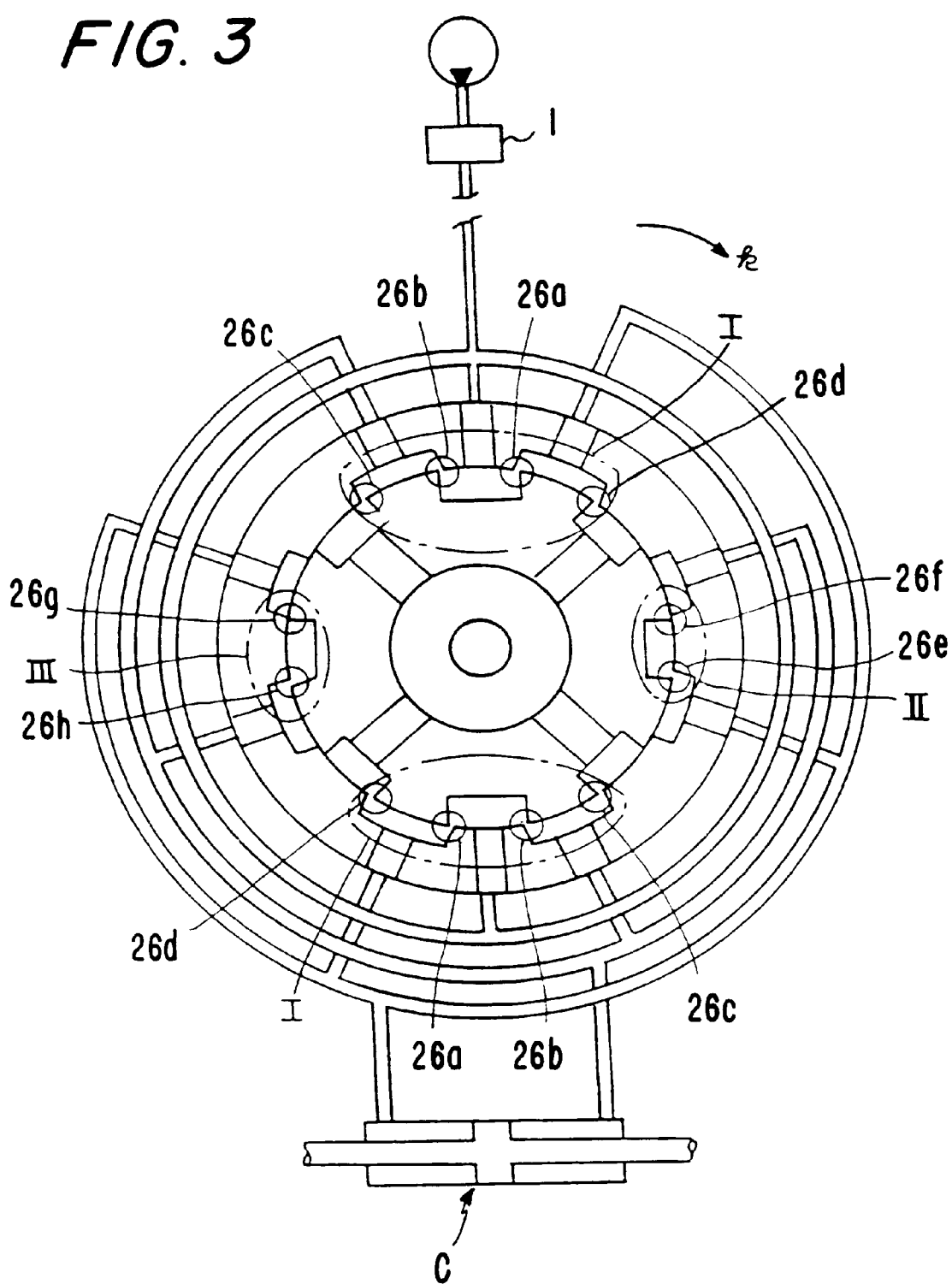
FIG. 3 is a sectional view of the rotary valve of FIG. 2 and shows positions of control throttles 26a through 26h (with hatching omitted for clarity)

In th is rotary valve, between each of the supply channels 15 and the respective first and second cylinder control grooves 20 and 21, as shown in FIG. 3, a pair of control throttles 26a, 26b are formed. As shown by the solid lines in FIG. 4A, these control throttles 26a, 26b are made to underlap so that they are open when the rotary valve is in a neutral state.

Also, between the first and second cylinder control grooves 20 and 21 and the return channels 16, as shown in FIG. 3, respective pairs of control throttles 26d, 26c are formed. As shown by the solid lines in FIG. 4A, these control throttles 26d, 26c are also made to underlap so that they are open when the rotary valve is in its neutral state.

These control throttles 26a through 26d constitute a first control valve I for controlling and distributing to the power cylinder C a control flow supplied from the flow control mechanism 1. This first control valve I constitutes a power cylinder control valve referred to in the present invention.

Between the bypass channel 18 positioned on the right side of FIG. 2 and the respective first and second bypass control grooves 22, 23, as shown in FIG. 3, control throttles 26e, 26f are formed. As shown by the solid lines in FIG. 4C, the control throttle 26e is made to underlap so that it is open when the rotary valve is in its neutral state. And as shown by the solid lines in FIG. 4B, the control throttle 26f is made to overlap so that it is closed when the rotary valve is in its neutral state.

These control throttles 26e, 26f constitute a second control valve II for bypassing the two pressure chambers of the power cylinder C.

Between the bypass channel 18 positioned on the left side of FIG. 2 and the respective first and second bypass control grooves 22 and 23, as shown in FIG. 3, control throttles 26g, 26h are formed. As shown by the solid lines in FIG. 4B, the control throttle 26g is made to overlap and is closed when the rotary valve is in its neutral state. And as shown by the solid lines in FIG. 4C, the control throttle 26h is made to underlap and is open when the rotary valve is in its neutral state.

These control throttles 26g and 26h constitute a third control valve III for bypassing the two pressure chambers of the power cylinder C.

Together, the second and third control valves II and III constitute a bypass control valve referred to in the present invention.

The operation of the power steering system of this preferred embodiment will now be described.

When the steering wheel W is turned slightly during non-steering, the load pressure P of the power cylinder C is in the range 0 to $P_1$. Therefore, as described above with reference to related art, only a minimum flow $Q_1$ is supplied from the flow control mechanism 1 to the rotary valve side (the region a in FIG. 16).

At this time, the rotary valve is ina substantially neutral state, and in the second and third control valves II and III the control throttles 26f and 26g are closed. Therefore, the above-mentioned minimum flow $Q_1$ cannot pass through these second and third control valves II and III, and all of it is returned to the tank through the control throttles 26a to 26d of the first control valve I.

When the steering wheel W is turned more substantially and the rotary spool 14 rotates against the sleeve 13 in the arrow k direction of FIGS. 2 and 3, the control throttles 26b and 26d of the first control valve I start to close and are constricted until the load pressure P of the power cylinder C reaches a predetermined pressure $P_1$.

Figure 4A:
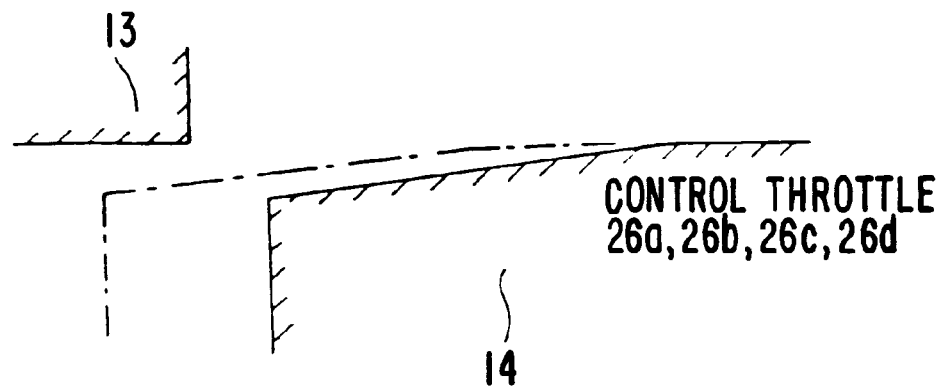
FIGS. 4A through 4C are views illustrating the control throttles 26a through 26h of the rotary valve in a neutral position, FIG. 4A showing the control throttles 26a through 26d, FIG. 4B showing the control throttles 26f and 26g and FIG. 4C showing the control throttles 26e and 26h.
Figure 4B:
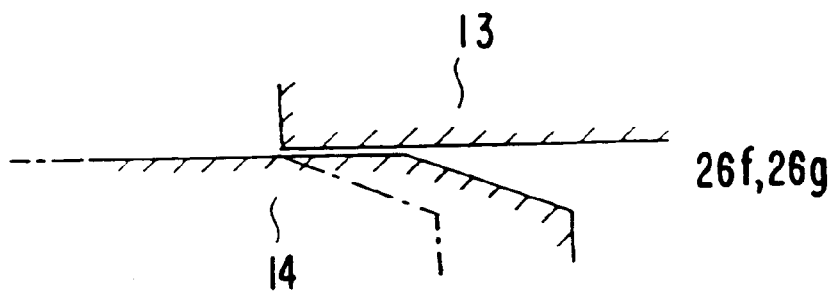
Figure 4C:
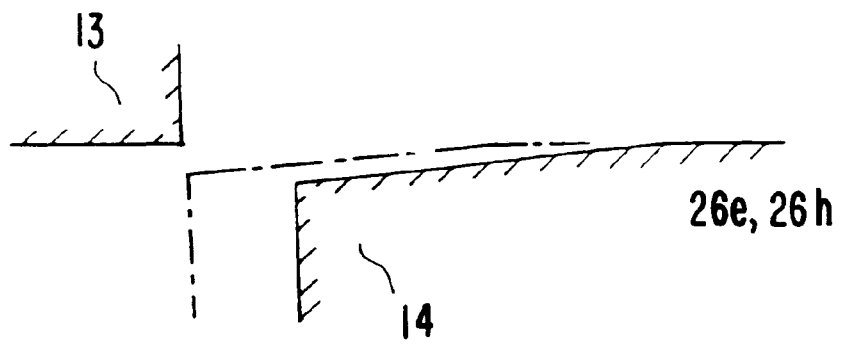
Figure 5:
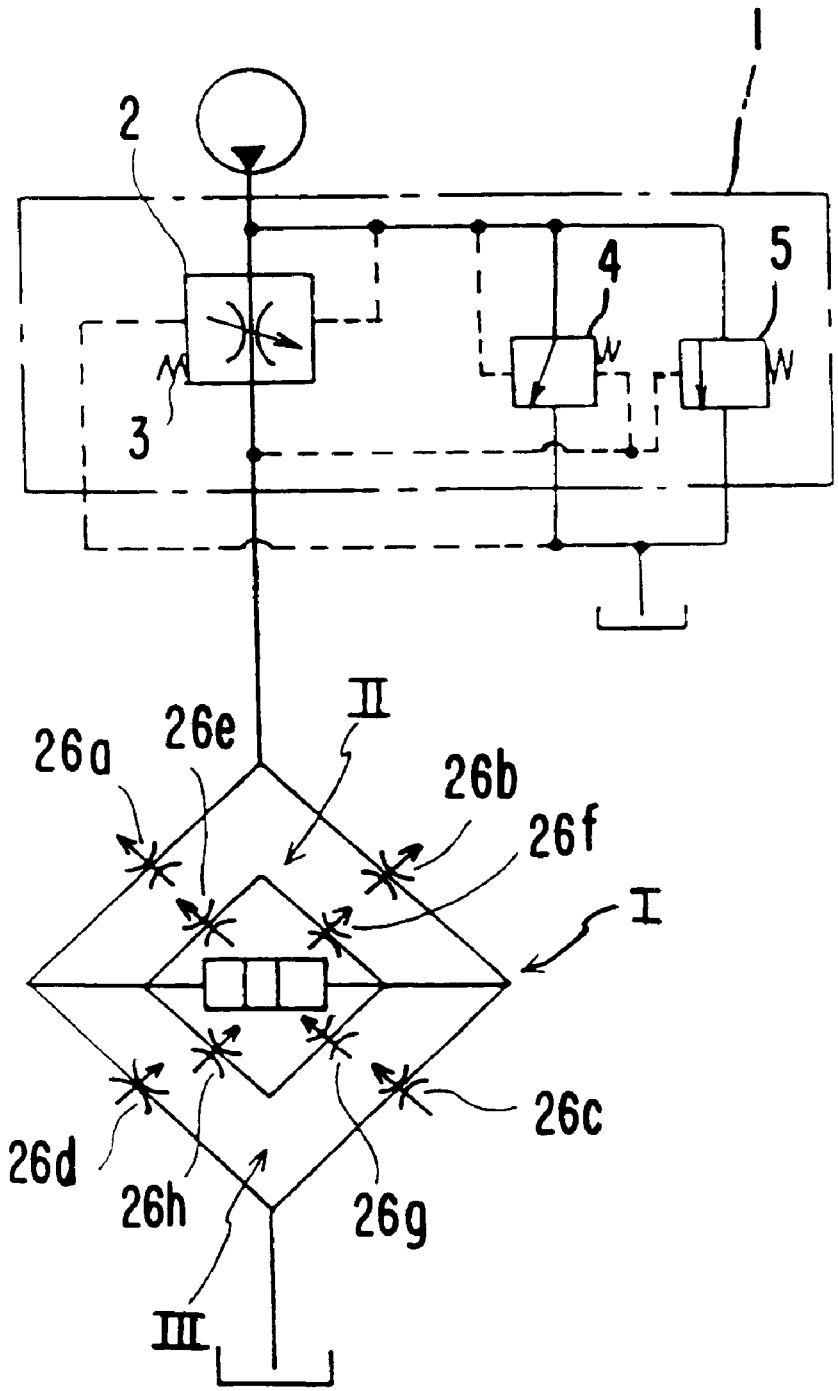
FIG. 5 is a circuit diagram of the power steering system of the first preferred embodiment.

At this time, in the third control valve III, the control throttle 26g is still closed, as shown by the dashed line in FIG. 4B, and the control throttle 26h is still open, as shown by the dashed line in FIG. 4C.

Of course, in the second control valve II, the control throttle 26f is still closed. That is, the two pressure chambers of the power cylinder C are still cut off from each other.

Therefore, fluid is guided to the first pressure chamber of the power cylinder C through the control throttles 26a of the first control valve I and fluid from the second pressure chamber is discharged through the control throttles 26c, and an assist force is exerted.

Figure 16:
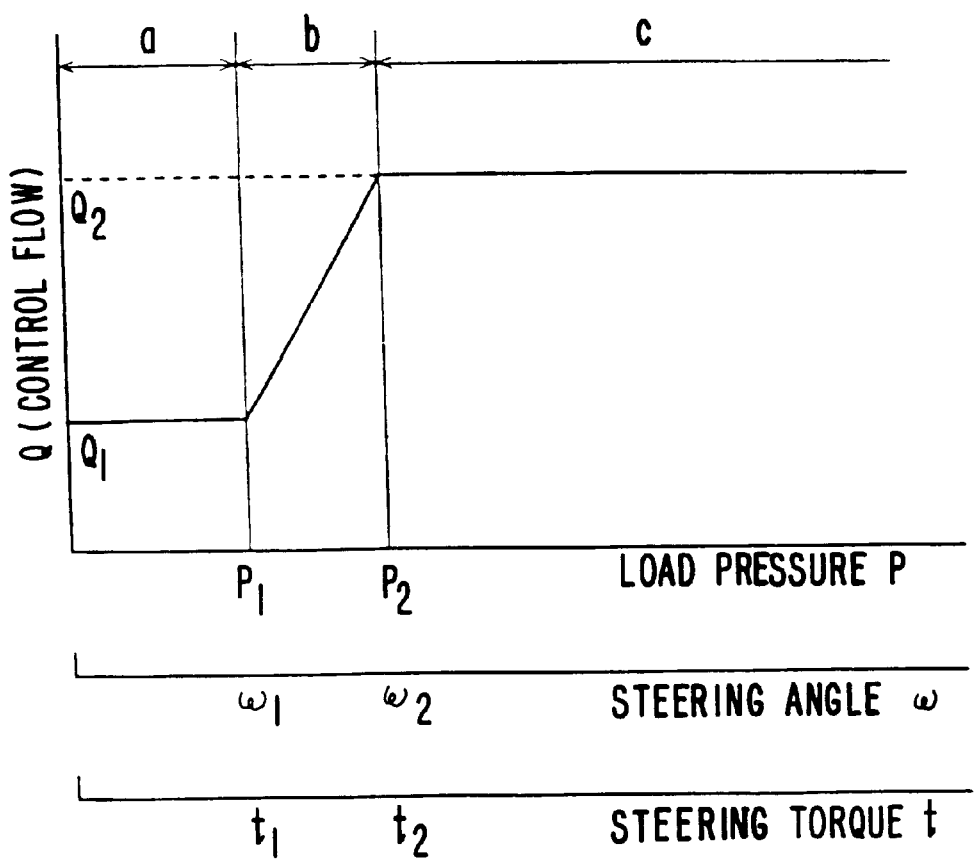
FIG. 16 is a chart showing a relationship between load pressure P (or steering angle ω, or steering torque t) and control flow Q.

If the steering wheel W is turned further and the load pressure P of the power cylinder C rises above the predetermined pressure $P_1$, the control flow Q supplied from the flow control mechanism 1 increases (the region b of FIG. 16).

At this time, as described above, fluid is guided to the first pressure chamber of the power cylinder C through the control throttles 26a of the first control valve I and fluid from the second pressure chamber is discharged through the control throttles 26c.

However, because in the third control valve III the control throttle 26g gradually starts to open, the two pressure chambers of the power cylinder C are bypassed. Consequently, some of the fluid guided to the first pressure chamber of the power cylinder C is guided through the third control valve III to the second pressure chamber and is discharged.

That is, even if the control flow Q increases from the minimum flow $Q_1$ to a flow $Q_2$ required for an assist force, the pressure difference between the two pressure chambers of the power cylinder C can be made to change gently compared with the change in flow. As a result, the driver does not experience a disconcerting feeling such as one of the steering wheel being taken over the moment the flow changes, and thus the steering feeling can be improved.

When the steering wheel W is turned a long way and the load pressure P of the power cylinder C rises above a set pressure $P_2$ (the region c in FIG. 16), the control throttle 26h of the third control valve III, which had been gradually starting to close, closes completely. Consequently, the two pressure chambers of the power cylinder C are again cut off from each other and the flow $Q_2$ required for an assist force is controlled by the first control valve I only, and a full assist force can be obtained.

When the steering wheel is turned in the opposite direction, the rotary valve turns in the opposite direction. In this case, when the control flow Q has increased from the minimum flow $Q_1$ to a flow $Q_2$ required for an assist force, the second control valve II bypasses the two pressure chambers of the power cylinder C.

Figure 6:
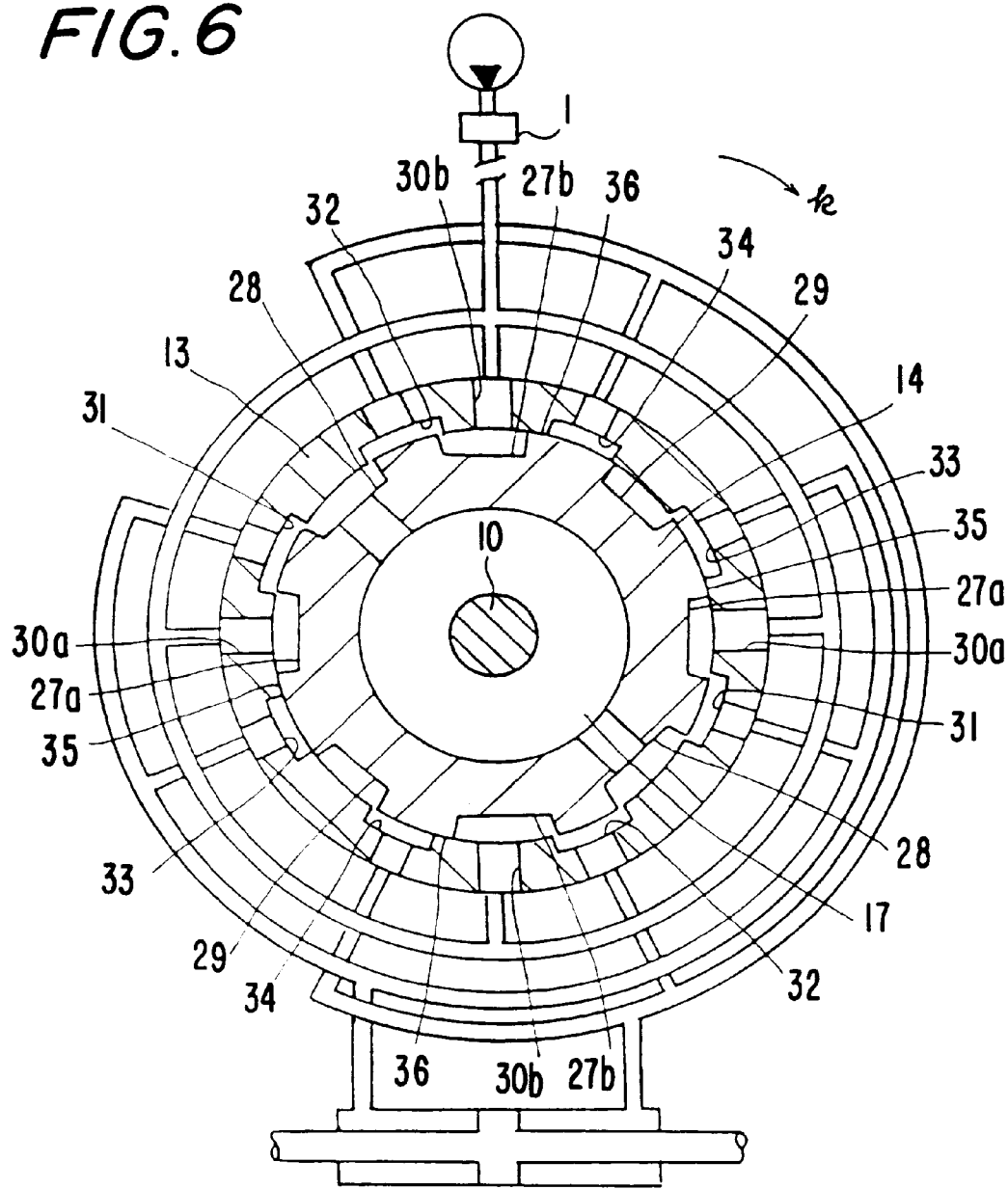
FIG. 6 is a sectional view of a rotary valve constituting a valve mechanism V in a power steering system of a second preferred embodiment.
Figure 7:
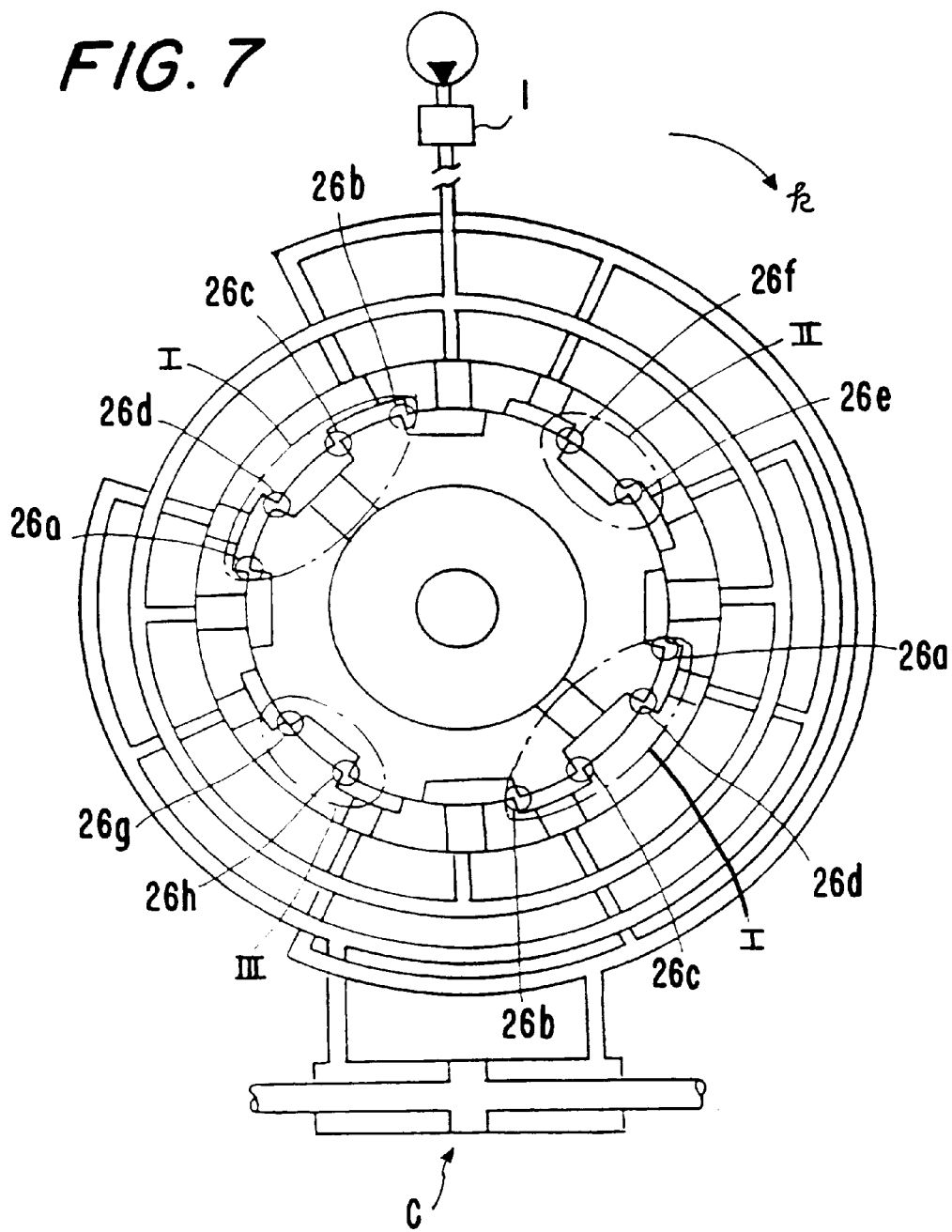
FIG. 7 is a sectional view of the rotary valve of FIG. 6 and shows positions of control throttles 26a through 26h (with hatching omitted for clarity)
Figure 8:
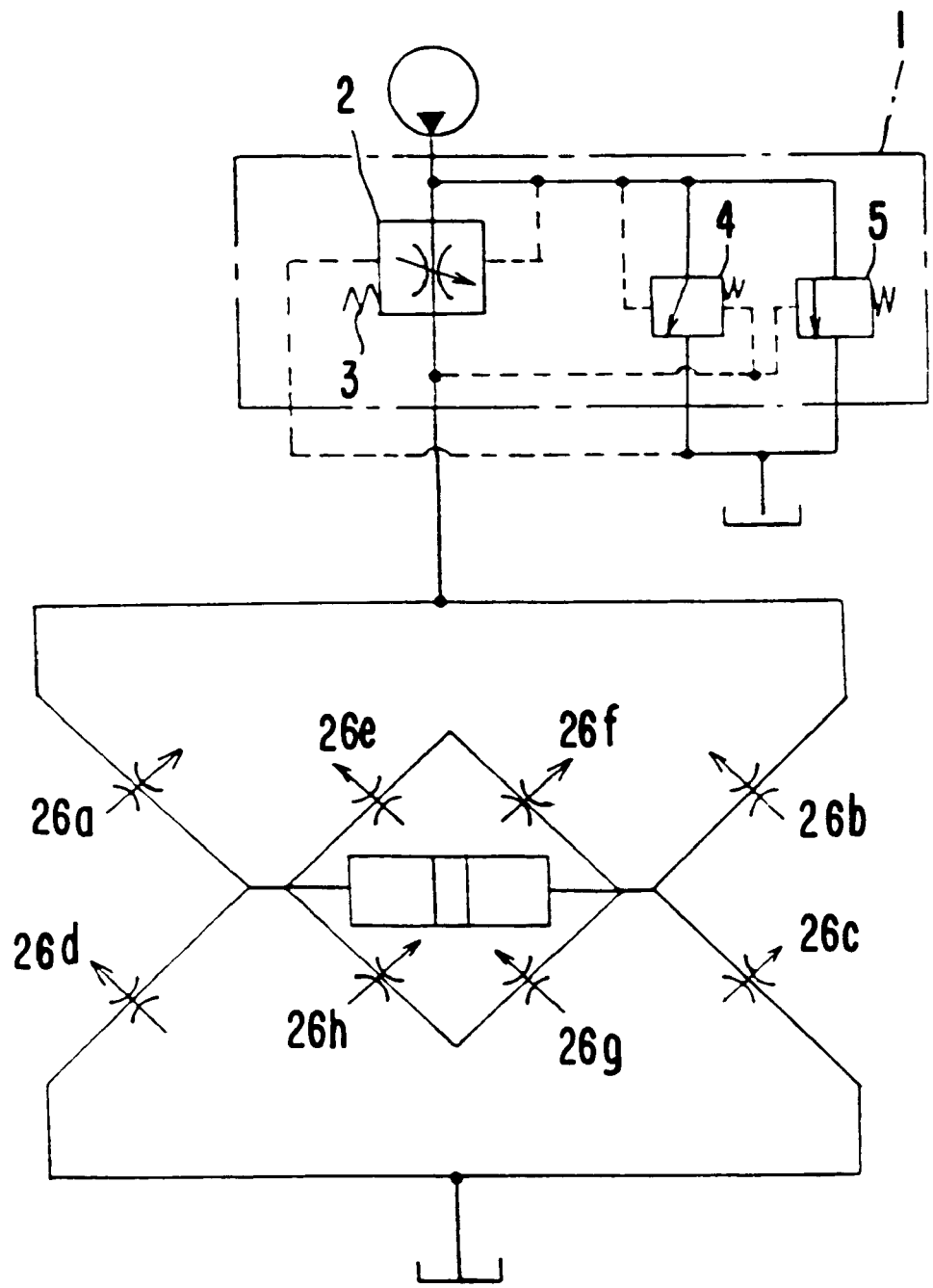
FIG. 8 is a circuit diagram of a power steering system of the second preferred embodiment.

A second preferred embodiment shown in FIGS. 6 through 8 has a modified construction of the rotary valve of the first preferred embodiment described above.

As shown in FIG. 6, a pair of first supply channels 27a disposed diametrically opposite each other are formed in the rotary spool 14. And a pair of second supply channels 27b are formed in positions staggered by about 90° in phase from the first supply channels 27a.

Also, four channels are formed in positions between these first and second channels 27a, 27b. Of these four channels, one pair of opposing channels are return channels 28 and another pair of opposing channels are bypass channels 29.

A pair of first input ports 30a for supplying control flow to the first supply channels 27 and a pair of second input ports 30b for supplying control flow to the second supply channels 28 are formed in the sleeve 13.

A pair of first cylinder control grooves 31 connecting with the first pressure chamber of the power cylinder C are formed on the return channel 28 sides of the first input ports 30a. A pair of second cylinder control grooves 32 connecting with the second pressure chamber of the power cylinder C are formed on the return channel 28 sides of the second input ports 30b.

Also, a pair of first bypass control grooves 33 are formed on the opposite sides of the first input ports 30a from the first cylinder control grooves 31. These first bypass control grooves 33 are connected with the first cylinder control grooves 31. However, block parts 35 are formed so that these first bypass control grooves 33 do not connect with the first supply channels 27a, even when the rotary valve has operated.

A pair of second bypass control grooves 34 are formed on the opposite sides of the second input ports 30b from the second cylinder control grooves 32. These second bypass control grooves 34 are connected with the second cylinder control grooves 32. However, blocks 36 are formed so that these second bypass control grooves 34 do not connect with the second supply channels 27b, even when the rotary valve has operated.

In this rotary valve, between the first and second supply channels 27a, 27b and the first and second cylinder control grooves 31, 32, as shown in FIG. 7, respective pairs of control throttles 26a, 26b are formed. And in the same way as in the first preferred embodiment, as shown in FIG. 4A, these control throttles 26a, 26b are made to underlap and are open when the rotary valve is in a neutral state.

Also, between the first and second cylinder control grooves 31, 32 and the return channels 28, as shown in FIG. 7, respective pairs of control throttles 26d, 26c are formed. And as in the first preferred embodiment, as shown in FIG. 4A, these control throttles 26d, 26c are also made to underlap and are open when the rotary valve is in its neutral state.

Between the bypass channel 29 positioned on the right side of FIG. 6 and the respective first and second bypass control grooves 33, 34, as shown in FIG. 7, control throttles 26e, 26f are formed. And as in the first preferred embodiment, as shown in FIG. 4C, the control throttle 26e is made to underlap and is open when the rotary valve is in its neutral state. And as shown in FIG. 4B, the control throttle 26f is made to overlap and is closed when the rotary valve is in its neutral state.

Between the bypass channel 29 positioned on the left side of FIG. 6 and the respective first and second bypass control grooves 33, 34, as shown in FIG. 7, control throttles 26g, 26h are formed. As in the first preferred embodiment, as shown in FIG. 4B, the control throttle 26g is made to overlap and is closed when the rotary valve is in its neutral state. And as shown in FIG. 4C, the control throttle 26h is made to underlap and is open when the rotary valve is in its neutral state.

The operation of the rotary valve of this second preferred embodiment is the same as that of the rotary valve of the first preferred embodiment described above, and accordingly a detailed description thereof will not be given here.

The flow control mechanism 1, as long as it has the characteristic shown in FIG. 16, is not limited to that described in the foregoing first and second preferred embodiments.

Figure 9:
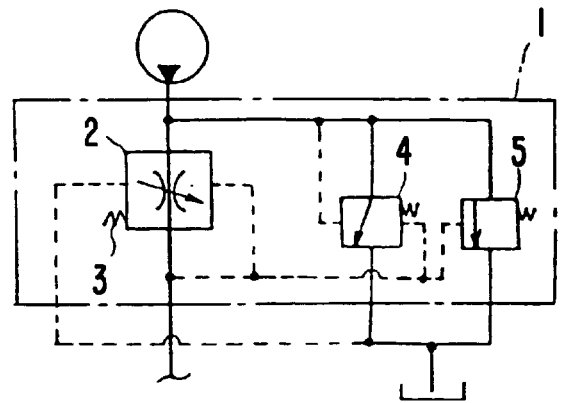
FIG. 9 is a view showing another example of the flow control mechanism 1.

The type shown in FIG. 9 has a construction such that, in the reverse of the case in the first and second preferred embodiments, the aperture of the variable throttle 2 is changed according to the pressure not of the upstream side but rather of the downstream side.

Figure 10:
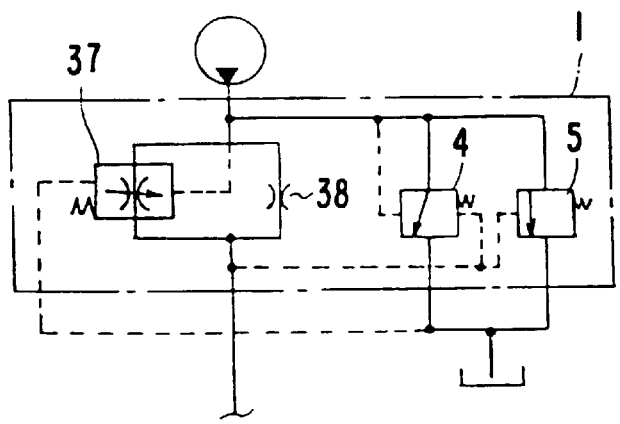
FIG. 10 is a view showing another example of the flow control mechanism 1.

In the type shown in FIG. 10, a variable throttle 37 and a fixed throttle 38 are connected to the pump in parallel. With this type, the variable throttle 37 in its normal position is completely closed, and the minimum flow $Q_1$ is determined by the aperture of the fixed throttle 38. When the load pressure P of the power cylinder C rises, the aperture of the variable throttle 37 increases and a control flow Q determined by that aperture and the aperture of the fixed throttle 38 is supplied to the valve mechanism V side.

Figure 11:
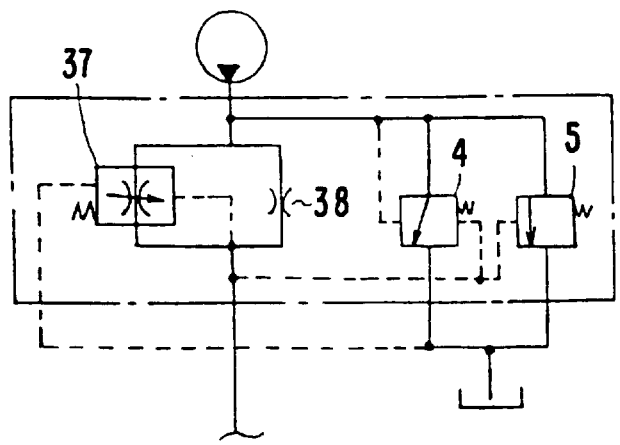
FIG. 11 is a view showing another example of the flow control mechanism 1.

With this type also, as shown in FIG. 11, the aperture of the variable throttle 37 may alternatively be made to change according to the pressure downstream of the variable throttle 37 and the fixed throttle 38.

Figure 12:
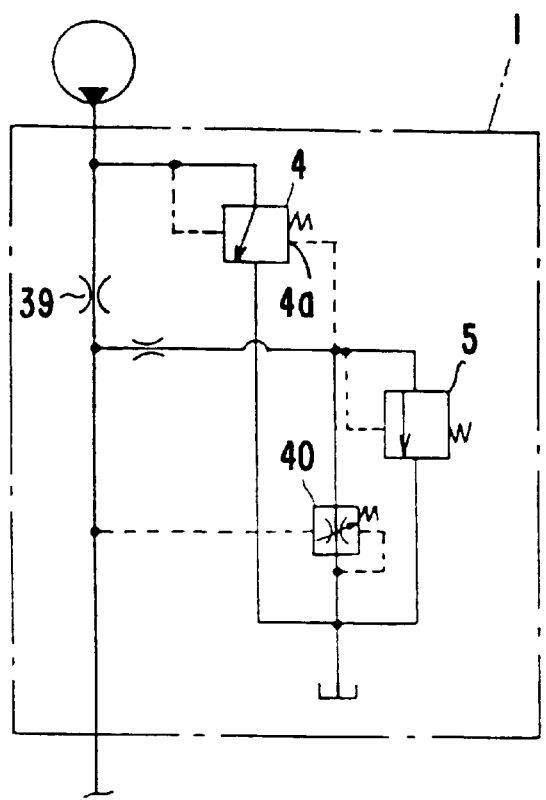
FIG. 12 is a view showing another example of the flow control mechanism 1.

In the type shown in FIG. 12, the pump is connected to the valve mechanism V side by way of a fixed throttle 39. In this case it is not the aperture of a throttle that is adjusted but rather the pressure difference across this fixed throttle 39 is adjusted to vary the control flow Q by the characteristic of a flow control valve 4 being changed.

That is, of pilot chambers of the flow control valve 4, a pilot chamber 4a connected to the downstream side of the fixed throttle 39 is connected with a tank, and in the course of that connection a load-sensitive valve 40 operating in correspondence with the load pressure P of the power cylinder C is interposed.

When the load pressure P is low, the load-sensitive valve 40 is open and the pressure of the pilot chamber 4a is lower than the downstream side pressure of the fixed throttle 39. Therefore, most of the output of the pump is returned to the tank through the flow control valve 4, and only a minimum flow $Q_1$ is supplied to the valve mechanism V side.

When on the other hand the load pressure P rises, the load-sensitive valve 40 closes and the downstream side pressure of the fixed throttle 39 is guided into the pilot chamber 4a. Consequently, the control flow Q supplied to the valve mechanism V side increases.

Then, when the load pressure P reaches a set pressure $P_2$, because the load-sensitive valve 40 completely closes, the flow control valve 4 operates to keep the pressure difference across the fixed throttle 39 constant. Consequently, according to that pressure difference, a control flow $Q_2$ is supplied to the valve mechanism V side.

Figure 13:
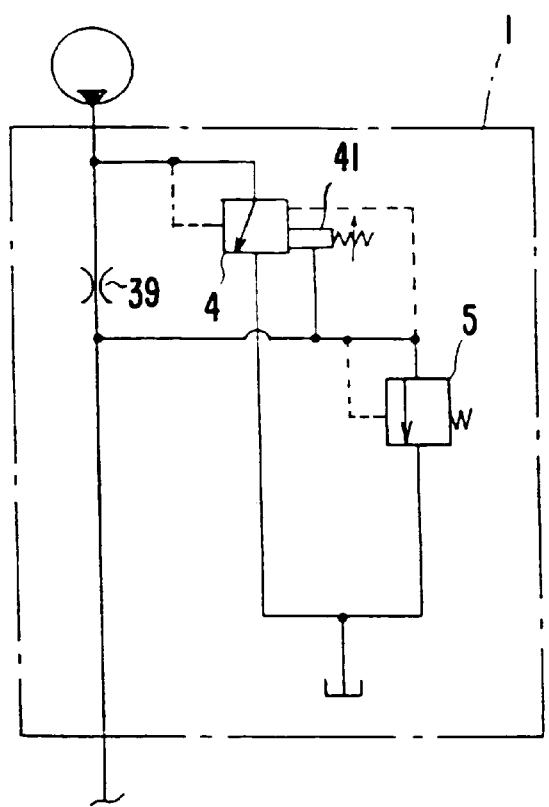
FIG. 13 is a view showing another example of the flow control mechanism 1.

Also in the type shown in FIG. 13, it is not the aperture of a throttle that is adjusted but rather the characteristic of the flow control valve 4.

That is, an actuator 41 capable of changing the initial load of the spring of a flow control valve 4 is provided, and this actuator 41 is operated in accordance with the load pressure P of the power cylinder C.

When the load pressure P is low, the actuator 41 keeps the initial load of the spring of the flow control valve 4 small. Consequently, the pressure difference across the fixed throttle 39 is small and only a minimum flow $Q_1$ is supplied to the valve mechanism V side.

When on the other hand the load pressure P rises, the actuator 41 operates correspondingly and increases the initial load of the spring of the flow control valve 4. Consequently, the pressure difference across the fixed throttle 39 increases and the control flow Q increases.

Figure 14:
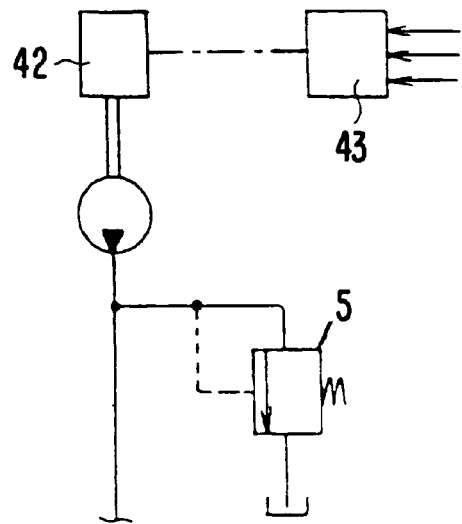
FIG. 14 is a view showing another example of the flow control mechanism 1.
Figure 15:
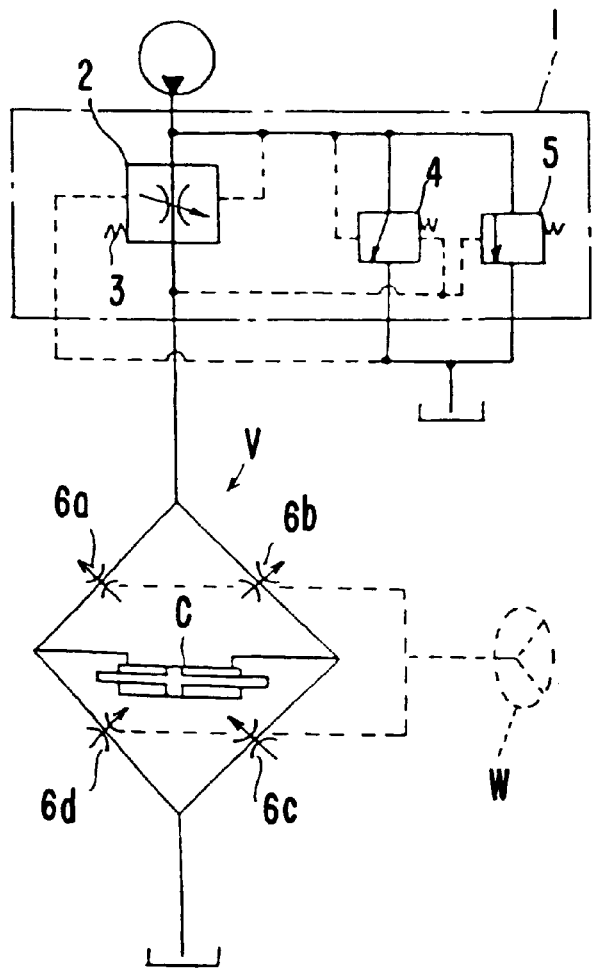
FIG. 15 is a circuit diagram showing a power steering system of the related art.

In the type shown in FIG. 14, the pump is driven by a motor 42 and this motor 42 is controlled by a controller 43.

The load pressure P of the power cylinder C is inputted into the controller 43 as a signal. When the load pressure P is low, the controller 43 issues a command to the motor 42 and makes the pump deliver a minimum flow $Q_1$ only. When on the other hand the load pressure P rises, the controller 43 issues a command to the motor 42 and increases the pump discharge to a flow $Q_2$ necessary for an assist force.

In this type shown in FIG. 14, when the load pressure P of the power cylinder C is low, the pump can be stopped and the minimum flow $Q_1$ made zero.

In the preferred embodiments described above, the control flow Q was changed with the load pressure P of the power cylinder C as a reference, but instead of this the steering angle ω or the steering torque t may alternatively be used.

For example, in a flow control mechanism 1 of the type shown in FIG. 14, the steering angle ω or the steering torque t is inputted into the controller 43. Then, as shown also in FIG. 16, when the steering angle ω or the steering torque t has risen above a predetermined angle $\omega_1$ or a predetermined torque $t_1$, the control flow Q is increased, whereby it is possible to obtain the same effects as in the preferred embodiments described above.

Although in the preferred embodiments described above the upstream side variable throttles 26g, 26f of the second control valve II and the third control valve III were made center-closed valves and the downstream side variable throttles 26h, 26e were made center-open valves, the invention is not limited to this configuration, and alternatively the upstream side variable throttles 26g, 26f may be made center-open valves and the downstream side variable throttles 26h, 26e may be made center-closed valves. However, in this case the piping relationships are of course different from those in the preferred embodiments.

As described above in detail, with the present invention, because when an assist force is not required the control flow supplied to the valve mechanism is kept to a minimal flow, it is possible to reduce energy loss.

Furthermore, because when the control flow is increased to a flow required for an assist force the two pressure chambers of the power cylinder are bypassed, the pressure difference between the two pressure chambers can be made to change more gently than the change in the flow. Consequently, the driver does not experience a disconcerting feeling such as one of the steering wheel being taken over the moment the flow changes, and the steering feeling can thus be improved.

In particular, if a rotary valve is provided with a power cylinder control valve and a bypass control valve according to the second and third provisions of the invention, the valve mechanism can be made simple.

What is claimed is:

1. A power steering system having a pump and a flow control mechanism 1 for controlling working fluid discharged by the pump and a valve mechanism V for controlling a control flow supplied from the flow control mechanism 1 and operating a power cylinder C, the flow control mechanism 1 maintaining the control flow Q at a minimum flow $Q_1$ when an assist force is not required and increasing the control flow Q and maintaining the control flow Q at a flow $Q_2$ required for the assist force when an assist force is required, wherein the valve mechanism V comprises a power cylinder control valve for controlling the control flow and distributively supplying it to the power cylinder C and a bypass control valve for bypassing pressure chambers of the power cylinder C and the bypass control valve is normally closed but opens and bypasses the pressure chambers of the power cylinder C while the control flow Q is increased from the minimum flow $Q_1$ to the flow $Q_2$ required for the assist force.

2. A power steering system according to claim 1, wherein the valve mechanism V comprises a rotary valve having a sleeve 13 and a rotary spool 14 fitted rotatably with respect to each other and in the rotary spool 14 are formed a pair of supply channels 15 disposed diametrically opposite each other and four return channels 16 respectively disposed on both sides of each of the supply channels 15 and a pair of bypass channels 18 disposed staggered by about 90° in phase from the supply channels 15 and in the sleeve 13 are formed a pair of input ports 19 for supplying the control flow Q to the supply channels 15 and a pair of first cylinder control grooves 20 respectively disposed on one side of each of the input ports 19 and connecting with a first pressure chamber of the power cylinder C and a pair of second cylinder control grooves 21 respectively disposed on the other side of each of the input ports 19 and connecting with a second pressure chamber of the power cylinder C and a pair of first bypass control grooves 22 respectively disposed on the opposite sides of the return channels 16 from the second cylinder control grooves 21 and connecting with the first cylinder control grooves 20 and a pair of second bypass control grooves 23 respectively disposed on the opposite sides of the return channels 16 from the first cylinder control grooves 20 and connecting with the second cylinder control grooves 21 and control throttles 26a, 26b, 26c and 26d are formed as center-open valves between the supply channels 15 and the first and second cylinder control grooves 20 and 21 and between the first and second cylinder control grooves 20 and 21 and the return channels 16 and these control throttles 26a, 26b, 26c and 26d constitute the power cylinder control valve and a control throttle 26e is formed as a center-open valve between one of the bypass channels 18 and the respective first bypass control groove 22 and a control throttle 26f is formed as a center-closed valve between the same bypass channel 18 and the respective second bypass control groove 23 and a control throttle 26g is formed as a center-closed valve between the other of the bypass channels 18 and the respective first bypass control groove 22 and a control throttle 26h is formed as a center-open valve between that bypass channel 18 and the respective second bypass control groove 23 and these control throttles 26e, 26f, 26g, and 26h constitute the bypass control valve.

3. A power steering system according to claim 1, wherein the valve mechanism v comprises a rotary valve having a sleeve 13 and a rotary spool 14 fitted rotatably with respect to each other and in the rotary spool 14 are formed a pair of first supply channels 27a disposed diametrically opposite each other and a pair of second supply channels 27b disposed staggered by about 90° in phase from the first supply channels 27a and four channels disposed between the first and second supply channels 27a, 27b and of these four channels one opposing pair of channels constitute return channels 28 and the remaining pair of channels constitute bypass channels 29 and in the sleeve 13 are formed a pair of first input ports 30a for supplying the control flow Q to the first supply channels 27a and a pair of second input ports 30b for supplying the control flow Q to the second supply channels 27b and a pair of first cylinder control grooves 31 respectively disposed on the return channel 28 sides of the first input ports 30a and connecting with a first pressure chamber of the power cylinder C and a pair of second cylinder control grooves 32 respectively disposed on the return channel 28 sides of the second input ports 30b and connecting with a second pressure chamber of the power cylinder C and a pair of first bypass control grooves 33 respectively disposed on the opposite sides of the first input ports 30a from the first cylinder control grooves 31 and connecting with the first cylinder control grooves 31 and a pair of second bypass control grooves 34 respectively disposed on the opposite sides of the second input ports 30b from the second cylinder control grooves 32 and connecting with the second cylinder control grooves 32 and between the first and second supply channels 27a, 27b and the first and second cylinder control grooves 31, 32 and between the first and second cylinder control grooves 31, 32 and the return channels 28 control throttles 26a, 26b, 26c and 26d are formed as center-open valves and these control throttles 26a, 26b, 26c and 26d constitute the power cylinder control valve and between one of the bypass channels 29 and the respective first bypass control groove 33 a control throttle 26e is formed as a center-open valve and between the same bypass channel 29 and the respective second bypass control groove 34 a control throttle 26f is formed as a center-closed valve and between the other bypass channel 29 and the respective first bypass control groove 33 a control throttle 26g is formed as a center-closed valve and between that bypass channel 29 and the respective second bypass control groove 34 a control throttle 26h is formed as a center-open valve and these control throttles 26e, 26f, 26g, and 26h constitute the bypass control valve.

4. A power steering system according to claim 1, wherein the flow control mechanism 1, when the load pressure P of the power cylinder C is lower than a predetermined pressure $P_1$, maintains the control flow Q at the minimum flow $Q_1$ and, when the load pressure P exceeds the predetermined pressure $P_1$, increases the control flow Q and, after the load pressure P reaches a set pressure $P_2$, maintains the load pressure P at a flow $Q_2$ required for an assist force.

5. A power steering system according to claim 1, wherein the flow control mechanism 1, when the steering angle ω is in a neutral range, maintains the control flow Q at the minimum flow $Q_1$ and, when the steering angle ω exceeds the neutral range, increases the control flow Q and, after the steering angle ω reaches a set angle $ω_2$, maintains the control flow Q at a flow $Q_2$ required for an assist force.

6. A power steering system according to claim 1, wherein the flow control mechanism 1, when the steering torque t is small, maintains the control flow Q at the minimum flow $Q_1$ and, when the steering torque t exceeds a predetermined torque $t_1$, increases the control flow Q and, after the steering torque t reaches a set torque $t_2$, maintains the control flow Q at a flow $Q_2$ required for an assist force.

* * * * *